United States Patent [19]

Shkolnik

[11] Patent Number: 4,462,476

[45] Date of Patent: Jul. 31, 1984

[54] WALKING APPARATUS

[76] Inventor: Nikolay Shkolnik, 15F Woodland Ave., Bloomfield, Conn. 06002

[21] Appl. No.: 415,386

[22] Filed: Sep. 7, 1982

Related U.S. Application Data

[63] Continuation-in-part of Ser. No. 252,903, Apr. 10, 1987, abandoned.

[51] Int. Cl.³ .............................................. B62D 57/02
[52] U.S. Cl. .................................... 180/8.6; 74/520; 280/1.181; 305/1
[58] Field of Search ...................... 180/8 R, 8.1–8.7, 180/8 E; 280/1.181, 28.5; 37/180, 92, 219, 266; 305/1; 74/520

[56] References Cited

U.S. PATENT DOCUMENTS

| | | | |
|---|---|---|---|
| 461,441 | 10/1891 | Knollin | 305/1 |
| 792,403 | 6/1905 | Crosse | 280/206 |
| 825,373 | 7/1906 | Bentson | 414/596 |
| 1,155,975 | 10/1915 | Antwerp | 37/92 |
| 1,298,953 | 4/1919 | Jenson | 180/8 B |
| 1,306,644 | 6/1919 | Tibbits | 180/8 D |
| 1,352,286 | 9/1920 | Larson | 180/8 B |
| 1,511,960 | 10/1924 | Goldschmidt | 180/8 R |
| 1,669,906 | 5/1928 | Kinch | 180/8 F |
| 1,682,717 | 8/1928 | Corona | 180/8 BA |
| 2,130,677 | 9/1938 | Turnball | 180/8 E |
| 2,179,765 | 11/1939 | Stock | 180/8 D |
| 2,290,118 | 7/1942 | Page | 180/8 D |
| 2,292,298 | 8/1942 | Singer | 305/1 |
| 2,399,417 | 4/1946 | Wilson et al. | 180/8 D |
| 2,430,537 | 11/1947 | Snell | 180/8 E |
| 2,452,632 | 11/1948 | Cameron | 180/8 C |
| 2,491,064 | 12/1949 | Urschel | 180/8.6 E |
| 2,785,761 | 3/1957 | Becker | 180/8 C |
| 2,914,127 | 11/1959 | Riconard | 180/8 C |
| 2,918,738 | 12/1959 | Barr | 37/80 R |
| 2,941,481 | 6/1960 | Philbrick | 105/31 |
| 3,078,941 | 2/1963 | Baron et al. | 180/8 D |
| 3,109,506 | 11/1963 | Schroter et al. | 180/8 R |
| 3,118,419 | 1/1964 | Bell | 180/187 |
| 3,135,345 | 6/1964 | Schruggs | 180/8 E |
| 3,194,583 | 7/1965 | Nottage | 280/229 |
| 3,337,239 | 8/1967 | Huffman, Jr. | 280/218 |
| 3,378,092 | 4/1968 | Ilon | 180/8 E |
| 3,446,301 | 5/1969 | Thomas | 180/8 C |
| 3,448,819 | 6/1969 | Peterson et al. | 180/8 D |
| 3,512,597 | 5/1970 | Baron | 180/8 C |
| 3,527,313 | 9/1970 | Reimann | 180/8 R |
| 3,537,540 | 11/1970 | Zuppiger et al. | 180/8 C |
| 3,765,499 | 10/1973 | Härmälä | 180/8 E/ |
| 3,853,196 | 12/1974 | Guest | 180/8 C |
| 4,202,423 | 5/1980 | Soto | 180/8.6 D |

FOREIGN PATENT DOCUMENTS

| | | | |
|---|---|---|---|
| 659809 | 2/1929 | France | 305/1 |
| 816702 | 5/1937 | France | 180/8.6 E |

OTHER PUBLICATIONS

Jones, Ed. *Ingenious Mechanisms for Designers and Inventors* (New York: The Industrial Press), pp. 395-397.
Sahag, *Kinematics of Machines* (New York: The Ronald Press), p. 207.

*Primary Examiner*—Joseph F. Peters, Jr.
*Assistant Examiner*—Mitchell J. Hill

[57] ABSTRACT

A walking device employs a linkage mechanism to drive a vehicle on skis supporting it. The linkage mechanism, of which Peaucellier's mechanism is a special case, is caused to raise the skis when a motor drives linkages to raise one of its pivot axes. During that portion of the cycle in which a given ski supports the vehicle, a locking mechanism locks its movable axis against movement, and the weight of the vehicle is thereby not transmitted to the motor.

21 Claims, 11 Drawing Figures

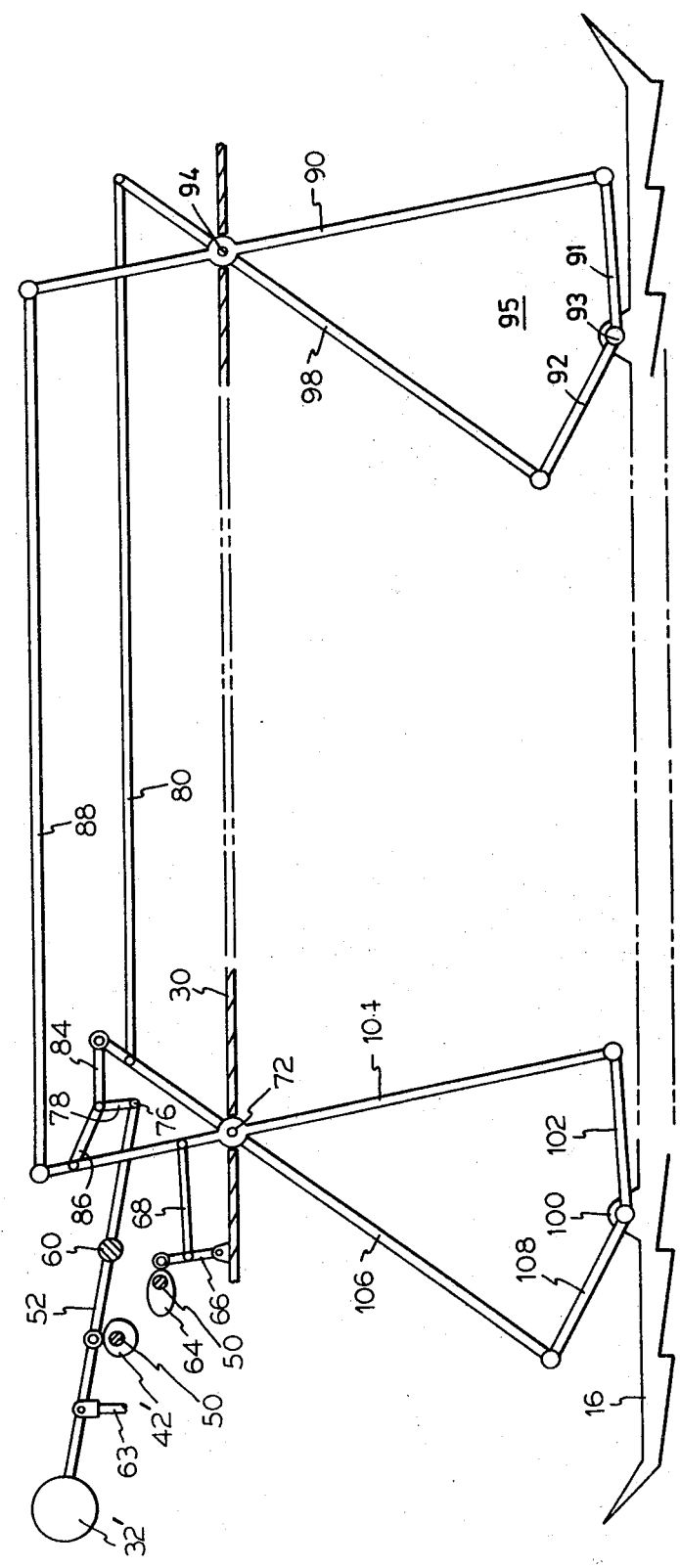
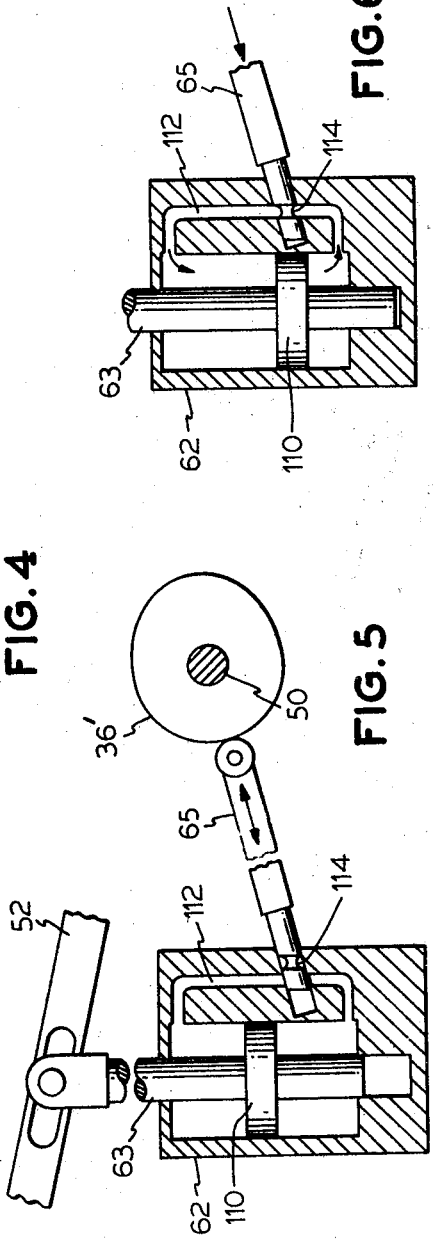

WALKING APPARATUS

CROSS REFERENCE TO RELATED APPLICATION

The present application is a continuation-in-part of my copending application Ser. No. 252,903, filed Apr. 10, 1981, now abandoned.

BACKGROUND OF THE INVENTION

The present invention relates to mechanisms for effecting straight-line motion and is particularly concerned with walking devices employing such mechanisms.

Over the years, the need has occasionally arisen for a vehicle employing something other than the conventional wheeldriven locomotion. In many cases, the need for such a vehicle was fulfilled by vehicles using walking-type mechanisms. In such a mechanism, the vehicle is supported by feet that are divided into two or more groups. Typically, one group is planted on the ground and supports the vehicle as the vehicle is moved relative to the supporting feet. Usually, another group, which is not resting on the ground, is moved relative to the vehicle at the same time. In other words, the vehicle mimics the walking motion of man and other animals.

It is desirable in vehicles of this type that the motion of the vehicle relative to the feet be in substantially a straight line; although some irregular motion will ordinarily occur as a result of uneven terrain, the uneven motion should not be inherent in the nature of the mechanism.

It is also desirable that such vehicles be made to operate as efficiently as possible. In the context of a walking device, it is therefore important that the energy expended not be used excessively in working against forces that result from the weight of the vehicle.

It is accordingly an object of the present invention to provide the desired straight-line motion in a walking-type vehicle that avoids dissipating excessive amounts of energy in working against forces caused by the weight of the vehicle. A related object is to provide an improved mechanism for straight-line motion.

SUMMARY OF THE INVENTION

The foregoing and related objects are achieved in a walking device that includes a body, at least first and second feet adapted for resting on a support surface, and means for alternately supporting the body on one of the first and second feet as the supporting foot rests on the support surface. The supporting means is operable to move the body relative to the supporting foot and to move the other foot relative to the body. The device can be operated to produce walking motion in which the first foot rests on the support surface and supports the body as the second foot moves forward relative to the body and the body moves forward relative to the first foot and in which the second foot then rests on the support surface and supports the body as the first foot moves forward relative to the body and the body moves forward relative to the second foot. According to the present invention, the body includes at least a first principal mounting means and at least a first auxiliary mounting means spaced from the first principal mounting means. The first foot includes a principal mounting portion on it, and the support means includes a linkage assembly connected between the body and the first foot. The linkage assembly includes first and second principal pivot links mounted at pivot points thereon on the first principal mounting means on the body for pivoting about a common pivot axis extending through the principal pivot points on the principal pivot links. Further included is an auxiliary pivot link pivotably mounted at a pivot point thereon on the first auxiliary mounting means on the body for pivoting about an auxiliary pivot axis parallel to the principal pivot axis and extending through the pivot point on the auxiliary pivot link.

Also included in the linkage assembly are first and second principal connecting links pivotably connected at principal linking points thereon to the first and second principal pivot links, respectively, for pivoting of the first and second principal connecting links relative to the first and second principal pivot links about axes substantially parallel to the principal pivot axis and extending through the principal linking points on the first and second principal connecting links, respectively. Each principal connecting link is connected at a foot point thereon to the principal mounting portion on the first foot for pivoting of the first and second principal connecting links relative to each other about an axis substantially parallel to the principal pivot axis and extending through the foot points on the first and second principal connecting links.

Finally, the linkage assembly includes first and second auxiliary connecting links pivotably connected at auxiliary linking points thereon to the auxiliary pivot link for pivoting relative to the auxiliary pivot link about an axis substantially parallel to the auxiliary pivot axis and extending through the auxiliary linking points on the auxiliary connecting links. The first and second auxiliary connecting links are pivotably connected at principal linking points thereon to the first and second principal pivot links, respectively, for pivoting of the first and second auxiliary connecting links relative to the first and second principal pivot links, respectively, about axes substantially parallel to the principal pivot axis and extending through the principal linking points of the first and second auxiliary connecting links, respectively.

The distances from the principal linking point on the first principal connecting link to the principal pivot axis and to the foot point on the first principal connecting link are substantially equal to the distances from the principal linking point on the second principal connecting link to the principal pivot axis and to the foot point on the second principal connecting link, respectively. The distances from the principal linking point on the first auxiliary connecting link to the auxiliary linking point on it and to the principal pivot axis are substantially equal to the distances from the principal linking point on the second auxiliary connecting link to the auxiliary linking point on it and to the principal pivot axis, respectively.

The distances between points on the links substanially bears the relationship $$W/X = Y/Z,$$

where W is the distance on the first auxiliary connecting link between the principal and auxiliary linking points, X is the distance between the principal pivot axis and the principal linking point on the first auxiliary connecting link, Y is the distance on the first principal connecting link between the foot point and principal linking point on it, and Z is the distance from the principal pivot axis to the principal linking point on the first principal connecting link. Motion of the foot point is in a substantially straight line that is substantially perpendicular to the plane defined by the principal and auxiliary pivot axes when the principal and auxiliary pivot axes are spaced by a distance equal to the distance between the auxiliary pivot axis and the auxiliary linking points on the auxiliary connecting links. Accordingly, substantially straight-line motion of the body relative to the first foot can be effected while the first foot rests on the support surface and the body is supported on the first foot if one of the principal pivot links is pivoted while the first principal and auxiliary mounting means on the body remain stationary relative to the body to keep their spacing equal to the distance between the auxiliary axis and the auxiliary linking points on the auxiliary connecting links.

In a walking device, it is preferable that the auxiliary mounting means be adjustable in position on the body to vary the distance between the principal and auxiliary pivot points. The supporting means then includes means for maintaining the auxiliary mounting means in position such that the spacing between the principal and auxiliary pivot axes is substantially equal to the distance on the auxiliary pivot link between its pivot point and its linking point while the body is supported on the first foot and for spacing the principal and auxiliary pivot axes farther apart when the body rests on the second foot. The first foot is thereby drawn closer to the body while the body rests on the second foot.

In the illustrated embodiment, the means for maintaining the auxiliary mounting means in position while the body rests on the first foot includes a passive locking means that is locked to hold the auxiliary mounting means in position while the body rests on the first foot but is unlocked to permit motion of the auxiliary pivot axis away from the principal pivot axis while the body rests on the second foot.

The means for moving the auxiliary mounting means in the illustrated embodiment includes a lever pivotably mounted on the body for pivoting about a pivot point. The auxiliary mounting means is provided on the lever and is spaced from its pivot point. A counterweight is included on the lever that is so sized and positioned that it aids the movement of the auxiliary mounting means away from the principal mounting means.

Preferably, the body further includes slave mounting means spaced from the principal mounting means, and the first foot further includes a slave mounting portion on it spaced from the first-mentioned mounting portion on the foot. The linkage assembly includes first and second slave pivot links, each of which has a pivot point and a linking point on it. The distance on the first slave pivot link between its pivot point and its linking point is substantially equal to the corresponding distance on the second slave pivot link. It is also substantially equal to the distance between the principal pivot axis and the principal linking points on the principal connecting links. The slave pivot links are pivotably mounted on the slave mounting means for pivoting about a slave pivot axis that is substantially parallel to the principal pivot axis and extends through the pivot points on the slave pivot links.

Also included in the linkage assembly are first and second slave connecting links and first and second drive links. Each slave connecting link has a linking point on it and a foot point on it, and the distance on the first slave connecting link between its linking point and its foot point is substantially equal to the corresponding distance on the second slave connecting link. It is also substantially equal to the distances between the foot points and principal linking points on the first and second principal connecting links. The first and second slave connecting links are pivotably connected at their respective linking points to the first and second slave pivot links, respectively, at their linking points for pivoting of the first and second slave connecting links relative to the first and second slave pivot links about axes substantially parallel to the slave pivot axis and extending through the linking points on the first and second slave pivot links and the first and second slave connecting links, respectively. Each slave connecting link is connected at its foot point to the slave mounting portion on the first foot for pivoting of the first and second slave connecting links relative to each other about an axis substantially parallel to the slave pivot axis and extending through the foot points on the first and second slave connecting links. The first and second drive links extend between the first principal and slave pivot links and between the second principal and slave pivot links, respectively, to hold the first and second slave pivot links parallel to the first and second principal pivot links, respectively. Accordingly, the foot point at which the slave connecting links are joined moves in the straight line as straight-line motion is executed by the foot point at which the principal connecting links are joined.

The walking device illustrated in the specification includes a second principal mounting means and a second auxiliary mounting means spaced from the second principal mounting means. The second foot includes a mounting portion on it, and the support means includes a second linkage assembly similar to the first-mentioned linkage assembly and connected between the body and the second foot. The principal pivot links of the second linkage assembly are pivotably mounted on the second principal mounting means, and the principal connecting links of the second linkage assembly are pivotably connected to the mounting portion on the second foot.

In the illustrated embodiment, the principal linking points on the principal connecting links are spaced along the principal pivot links from the principal linking points on the auxiliary connecting links. The body provides a bottom wall and defines a substantially enclosed chamber extending above the bottom wall and associated with the first foot. The main mounting means is provided on the bottom wall, and the auxiliary mounting means is spaced from the bottom wall within the chamber. The auxiliary pivot link and the auxiliary connecting links are contained inside the chamber, and the principal connecting links and the first foot are disposed outside the chamber. This feature is possible because a novel linkage assembly of this type is taught in which the auxiliary connecting links are connected to the principal pivot links at positions spaced from those at which the principal connecting links are connected to the principal pivot links. Preferably, the principal pivot axis is disposed between the principal linking points on the first principal and auxiliary connecting links and also between the principal linking points on the second principal and auxiliary connecting links.

BRIEF DESCRIPTION OF THE DRAWINGS

These and further features and advantages of the present invention are described in connection with the attached drawings, in which:

FIG. 4 is a diagrammatic representation of the propulsion system illustrated in FIG. 3;

FIG. 5 is a simplified view of the hydraulic lock mechanism of FIG. 3 in its locked position;

FIG. 6 is a view similar to that of FIG. 5 but showing the unlocked position;

DETAILED DESCRIPTION OF THE PREFERRED EMBODIMENT

Figure 1:
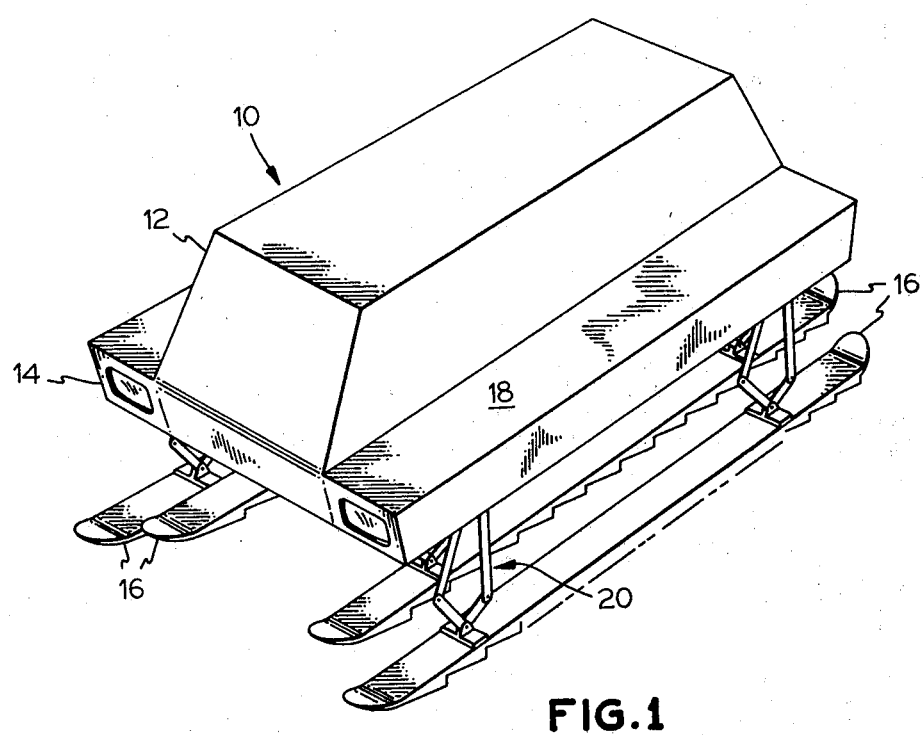
FIG. 1 is a perspective view of a walking vehicle employing the teachings of the present invention.
Figures 7, 8:
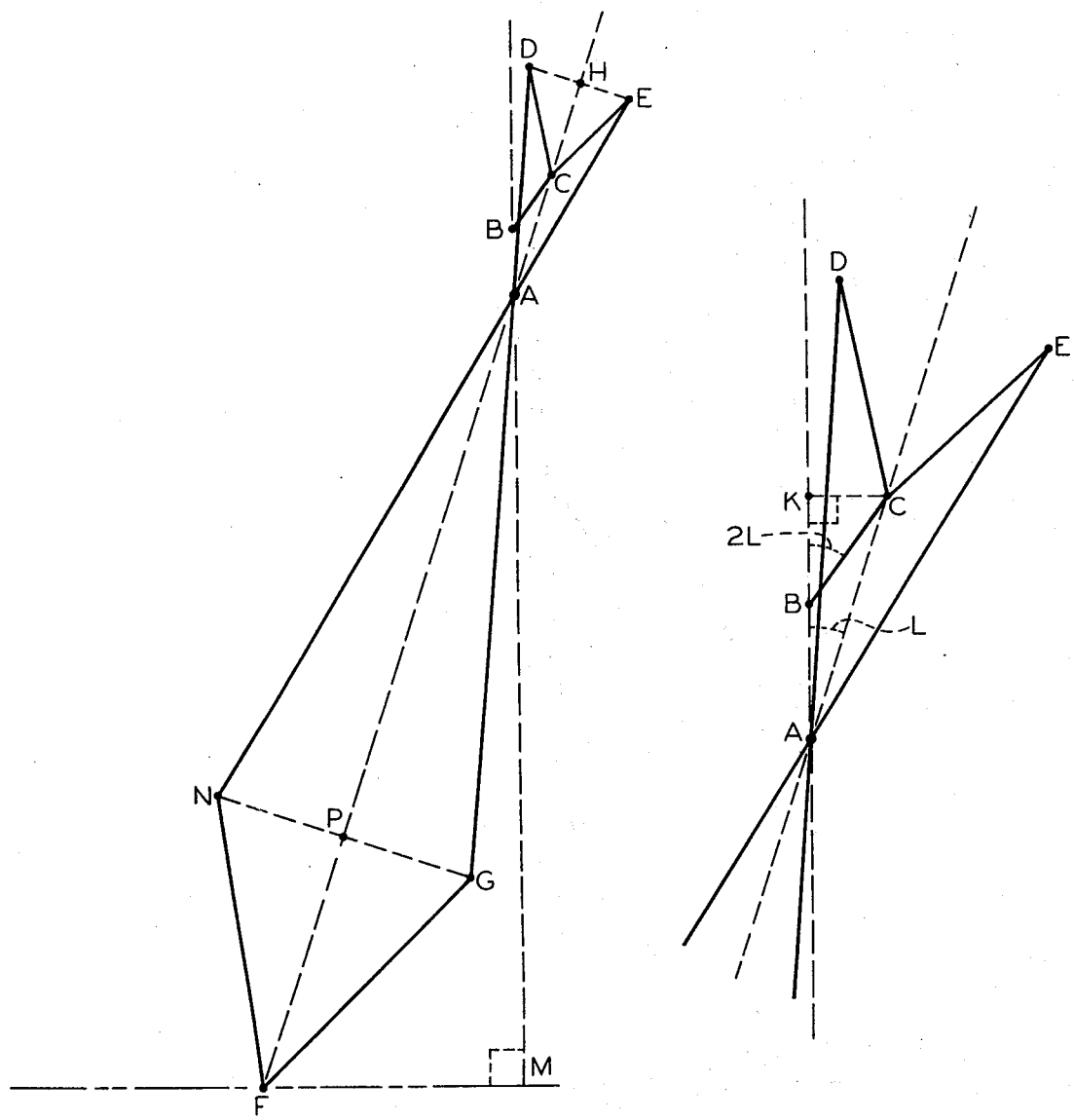
FIG. 7 is a diagram used to illustrate the theory of operation of the linkage mechanism employed in the walking vehicle.
FIG. 8 is a diagram showing a part of the diagram of FIG. 7 in greater detail.

The drawings illustrate a propulsion mechanism for a walking-type vehicle as well as an improved linkage mechanism for achieving straight-line motion generally. FIG. 1 is a generalized representation of the external structure of a walking-type vehicle. The vehicle walks on skis that are connected to the rest of the vehicle by linkages diagrammatically illustrated in FIG. 7. The points A and B in FIG. 7 represent stationary or quasi-stationary points in the vehicle, while point F represents the point of connection of the linkage to the ski. The various line segments in FIG. 7 represent links, and it is demonstrated below that, if certain relationships are observed in the design of the linkage system illustrated in FIG. 7, the motion of point F relative to points A and B will be in a straight line; in other words, if point F is at rest, the vehicle, which is stationary with respect to point A, will move in a straight line relative to the skis.

FIG. 1 represents in a generalized fashion a vehicle 10 with a cab portion suggested by reference numeral 12. The structure widens into right and left suspension housings 14 and 18 and is supported on skis 16 connected to the vehicle by a linkage assembly 20.

Figure 2:
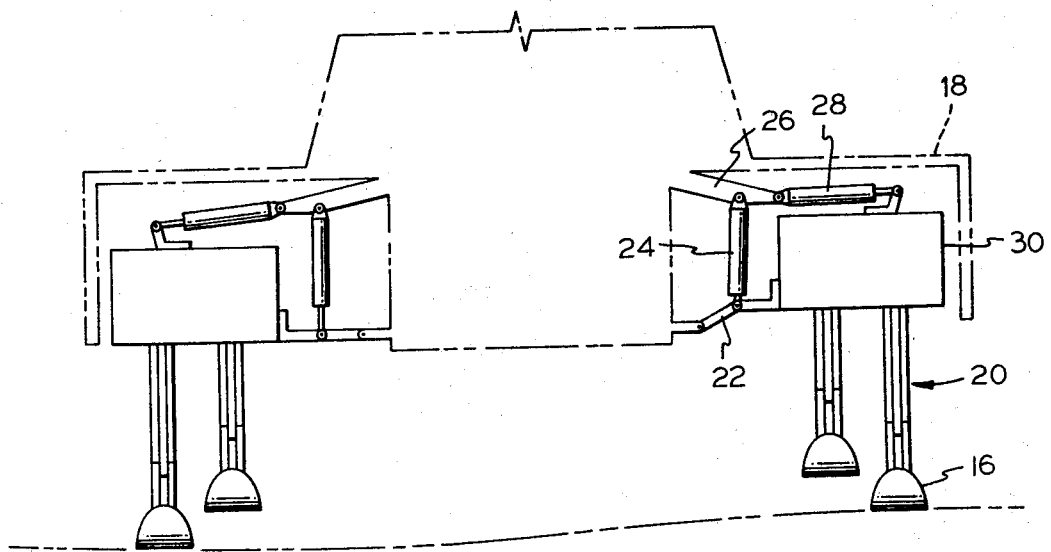
FIG. 2 is a simplified front elevation of the vehicle of FIG. 1 showing only the propulsion system.

The left suspension housing 18 is seen in FIG. 2 to cover a propulsion system evidencd by propulsion-system housing 30 and a suspension system that connects it to the rest of the vehicle. The suspension system is represented in FIG. 2 by links 22 and 26 and symbols 24 and 28 suggesting combinations of springs and shock absorbers. Like the vehicle outline, the suspension system is merely given a generalized representation; its particular arrangement will be a matter of design choice to those skilled in the art.

Figure 3:
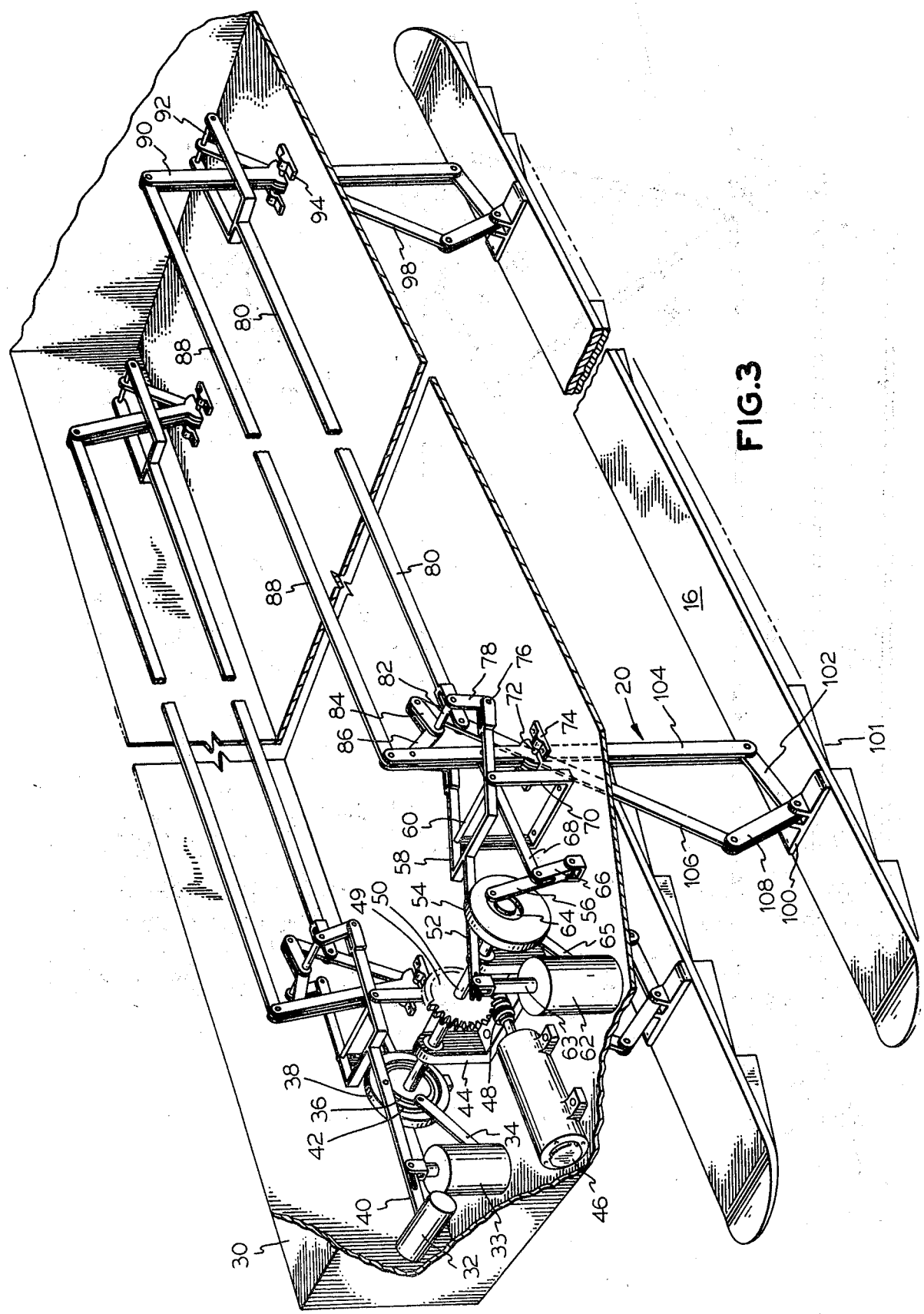
FIG. 3 is a perspective view with parts broken away of one-half of the propulsion system illustrated in FIG. 2.

The interior of the chamber defined by propulsion-system housing 30 is illustrated in FIG. 3. The base or bottom of housing 30 may be considered to be a frame member. The various components are shown in a somewhat simplified form illustrate a number of advantageous features that can be included in a vehicle employing the teachings of the present invention. Mounted inside propulsion-system housing 30 is an electric motor 46 that drives the two skis illustrated in FIG. 3 through a pair of operating mechanisms hereinafter described. A similar motor might be provided inside the right propulsion system housing, although a single motor could, of course, be used to drive both pairs of skis. It may be found advantageous to provide an internal-combusion engine (not shown) in the vehicle to drive a generator and thereby supply electrical power to the motors. Alternatively, the system could run on batteries. It will be apparent to those skilled in the art that other systems for providing motive power could also be used.

In the illustrated system, two motors are used, one for each propulsion system, and they are synchronized so that corresponding skis operate in unison. Motor 46 operates a worm 48 that in turn drives a worm gear 49 for rotating a shaft 50 journaled in a shaft support 44 anchored to the floor of propulsion-system housing 30.

Two cam wheels 38 and 54 are provided at opposite ends of drive shaft 50, each wheel providing three cam grooves for driving various linkages in the drive system. It can be seen in FIG. 3 that cam wheel 38 includes inner and outer cam grooves 36 and 42. A link 34 that operates a hydraulic lock 33 is suitably seated in inner groove 36 for driving by cam wheel 38. Another link, ski-support and lifting lever 40, is similarly seated in outer cam groove 42 and is provided with a counterweight, 32 at its left end. Corresponding ski-support and lifting lever 52 is broken off in FIG. 3 so that a similar counterweight does not obstruct the view of other elements.

Ski-support and lifting lever 52 divides toward its rear into a fork 58 and is pivotably supported at its fork portion by an appropriate auxiliary mounting means 70 including a support-lever pivot shaft 60 extending through both arms of the fork.

Ski-support and lifting lever 52 is connected near its front end to a piston rod 63 that is attached to a piston in the interior of hydraulic lock 62. Hydraulic lock 62 is similar in operation to hydraulic lock 33, which is operable by insertion and retraction of link 34 to lock ski-support and lifting lever 40 in position. Similarly, ski-support lever 52 can be locked in position by hydraulic lock 62.

At the ends of its arms, ski-support lever 52 provides pivot points 76 at which auxiliary pivot links 78 are pivotably connected. Auxiliary pivot links 78 support a pivot pin 82 between them. Motor 46, shaft 48, gear 49, shaft 50, cam wheels 38 and 54, may be termed a drive system for operating a ski-support and lifting lever 52, and a drive link 68, as hereinafter described.

While its associated ski 16 rests on the ground and supports the vehicle, ski-support lever 52 is locked in position by hydraulic lock 62 to hold pivot points 76 in stationary positions. As will be described below, this insures that any pivoting of linkage assembly 20 results in straight-line motion of ski 16. Subsequently, when the ski is to be raised, lock 62 is released, and cam wheel 54 acts to drive pivot points 76 upward and thereby raise the associated ski 16.

The face of cam wheel 54 that is not visible in FIG. 3 has grooves similar to grooves 36 and 42. Its other face provides a cam groove 64, and an arm 58 of drive fork 66 is suitably seated in groove 64 for driving by cam wheel 54. The purpose of drive fork 66 is to drive linkage mechanism 20 back and forth with the rotation of cam wheel 54. This function is carried out by way of a drive link 68 connected between drive fork 66 and a first principal pivot link 104 in linkage mechanism 20.

Link 104 and second principal pivot link 106 are pivotably mounted on the vehicle body by means of brackets 74 that hold a pivot pin 72, which provides a common principal pivot axis for principal pivot links 104 and 106. Principal pivot links 104 and 106 are connected by first and second principal connecting links 102 and 108, respectively, to a mounting portion 100 on ski 16. The connections on the several links provide relative pivoting about axes parallel to the axis of pivot pin 72.

The upper ends of principal pivot links 104 and 106 are connected to first and second auxiliary connecting links 86 and 84, respectively, which in turn are pivotably connected together for relative pivoting about an axis defined by a pivot pin 82 supported between the ends of auxiliary pivot links 78.

The significance of the various connections in linkage assembly 20 will be described in more detail below. It suffices at this point to say that the links are so connected that pivoting of principal pivot links 106 and 104 results in straight-line motion of ski 16 if pivot point 76 is locked in the correct position. By raising pivot point 76 from the correct position, it is possible to raise the associated ski 16. With this feature in mind, it can be appreciated that straight-line motion is also provided by slave pivot links 90 and 98 that are pivotably mounted by an appropriate slave principal mounting means 94 defining a slave principal axis and connected to ski 16 by appropriate slave connecting links 91 and 92. Slave connecting links 91 and 92 are connected to ski 16 at a common pivotal axis 93. Since the corresponding links 104, 106 and 90, 98 are of the same length and identically connected, straight-line motion results because slave pivot link 90 is constrained to remain parallel to principal pivot link 104 by connection through a slave drive link 88, while a similar slave drive link 80 connects the other two principal and slave pivot links. Slave drive link 88 is pivotally connected to principal pivot link 104 and slave pivot link 90, and slave drive link 80 is pivotally connected to slave link 98 and principal link 106. The slave links 90, 98, and the slave connecting links 91 and 92 comprise a slave linkage 95.

The various linkages driven by cam wheel 38 are similar to those driven by cam wheel 54, but cam wheel 38 is 180° out of phase with cam wheel 54. Accordingly, when the ski associated with cam wheel 38 is raised, the other ski is lowered, and vice versa.

It will be noted that the bottom surfaces of skis 16 are depicted in FIG. 3 as having a sawtooth configuration 101. This configuration is included in the drawing to indicate that skis 16 could be in the form of pontoons on an amphibious vehicle, and it is apparent that a sawtooth configuration such as this would be helpful in providing propulsion over the surface of a body of water.

FIG. 4 shows in simplified form the various linkages employed in driving a ski 16. Parts in FIG. 4 have the same reference numerals as corresponding parts in FIG. 3, so description of corresponding parts in FIG. 4 will not be duplicated. It should be noted, however, that counterweight 32' and cam groove 42' have been given primed reference numerals since their corresponding parts are not shown on the same mechanism as the other corresponding parts. Also, cam grooves 42' and 64 are spaced apart in FIG. 4 for clarity, although they actually rotate about a common axis.

The driving of the linkage mechanism can be understood by reference to FIG. 4 in connection with FIGS. 5 and 6, which represent the operation of the hydraulic lock. In FIG. 5, hydraulic lock 62 is shown in the form of a cylinder in which a piston 110 is slidably mounted for control of the height of piston rod 63, which in turn controls the motion of ski-support lever 52. A bypass conduit 112 is provided in cylinder 62 to permit hydraulic fluid to pass from the portion of the cylinder above piston 110 to the part below it. When fluid is permitted to flow in conduit 112, piston 110 can reciprocate, but prevention of flow in bypass conduit 112 locks piston 110 in position and thereby prevents movement of rod 63 and lever 52.

In the position shown in FIG. 5, operating member 65 is so positioned that a relieved portion 114 is out of alignment with bypass conduit 112, so flow of hydraulic fluid through bypass conduit 112 is prevented. Accordingly, lever 52 is prevented from moving, and auxiliary pivot point 76 remains stationary as a result. Hydraulic lock 64 remains in this locked state throughout that portion of the cycle during which the associated ski rests on the ground. This is approximately half the cycle or half of a rotation of shaft 50, and approximately half of cam groove 36 is accordingly in the shape of an arc whose center is on the axis of shaft 50. It is this part of groove 36 that keeps valve operating member 65 stationary while the associated ski rests on the ground. The remainder of the cam groove 36' bulges out to drive operating member 65 to the position illustrated in FIG. 6, in which relieved portion 114 is aligned with conduit 112 and permits hydraulic flow and therefore motion of ski-support lever 52.

With the operation of the hydraulic lock in mind, the method of driving of the linkages is apparent from a review of FIG. 4. During that part of the cycle in which ski 16 supports the vehicle, lock 62 cooperates with pivot shaft 60 to hold ski-support lever 52 stationary and thus maintain auxiliary pivot axis 76 in the fixed position required for straight-line motion. With pivot points 72 and 76 remaining stationary, cam groove 64 drives drive fork 66 and thus first principal pivot link 104 by means of link 68. With the relative positions of pivot axes 72 and 76 correctly maintained, pivoting of principal pivot links 104 and 106 will be complemented by pivoting of principal connecting links 102 and 108 in such a manner that the vertical distance to ski 16 will remain constant. However, the horizontal position of ski 16 relative to bottom wall 30 changes as a result of driving by link 68, and links 80 and 88 cause the rear part of ski 62 to execute the same motion, so the vehicle is propelled forward in a straight line.

When the ski reaches the rear of its travel, cam groove 36' reaches the portion of its cycle in which it drives operating member 65 inwardly, thus unlocking hydraulic lock 62. At the same time, cam groove 42' reaches the end of its constant-radius portion, and its radius starts to decrease. This lowers the forward portion of ski-support and lifting lever 52 with the help of counterweight 32, and auxiliary pivot axis 76 is raised, thereby raising the ski.

During this portion of the motion, cam groove 64 continues to drive first principal pivot link 104, moving it forward relative to the vehicle while the ski is raised. While the ski shown in FIG. 4 is being raised, the other ski rests on the ground because its cams are 180° out of phase with those driving the ski in FIG. 4. Accordingly, the skis are alternately lowered and raised and driven forward and backward, thus causing the vehicle to be propelled over the ground.

Certain features of this mechanism should be noted in particular. One is the provision of counterweight 32. By the choice of an appropriate counterweight, the weight of the associated ski can be effectively balanced. As a result, during that portion of the cycle in which the ski is being raised, no gravitational force of any significance is transmitted to cam surface 42, which raises and lowers the ski. Gravity is thus a factor only to the extent that it contributes to the friction in the various linkage connections that must be overcome to move the skis. Thus, motor 46 does not have to channel energy into the potential energy required to raise the ski, and, since the gravitational force also is not borne by cam surface 42, gravity does not contribute to friction at that point.

During that portion of the cycle in which the ski rests on the ground and the vehicle rests on the ski, the weight that is borne by the linkages is that of the vehicle, not that of the skis, so the counterweight does not balance it. However, the contribution of the force of gravity to the amount of effort that must be expended by motor 46 still remains low. Since cam 42 maintains a constant radius during this portion of the cycle, motor 46 is not directly exerting torque against the force of gravity. Furthermore, the gravitational force is not borne by cam surface 42 because hydraulic lock 62 bears the weight, and lock 62 is a passive means of support; no energy is required to keep it locked for support of the vehicle. Surface 42 is thus not really involved in determining the position of pivot lever 52 during this portion of the cycle. Furthermore, since linkage mechanism 20 inherently provides straight-line motion when the auxiliary pivot axis is in the proper position, the only force that motor 46 must overcome in rotating cam surface 64 to drive fork 66 is that due to inertia and friction; no lifting is involved.

The relationships of the various links that result in straight-line motion are described in connection with FIG. 7, in which the correspondence between the line segments and the various links is apparent. Point A, for instance, represents principal pivot point 72, point B represents auxiliary pivot point 76, and point F represents the common foot point of the two principal connecting links 102 and 108.

The distance between the foot point F and the linking point G on the first principal connecting link should be equal to the corresponding length on the second principal connecting link FN. Similarly, the distance on the first auxiliary connecting link between its principal linking point D and its auxiliary linking point C should be equal to the corresponding distance CE on the second auxiliary connecting link. Also, the distances on the first principal pivot link between the principal pivot point A and the linking points G and D should be equal to the corresponding lengths AN and AE on the second principal pivot link. Finally, the distance from the auxiliary pivot axis B to the auxiliary linking points C on the auxiliary connecting links should equal the distance between the principal pivot axis A and the auxiliary pivot axis B. As was noted above, the auxiliary pivot point is held stationary during the support portion of the cycle, and the cams and linkages are so arranged that the foregoing relationship between AB and BC is maintained.

In addition to the foregoing relationships, one further relationship must obtain: CD/AD must equal FG/AG.

That these relationships result in straight-line motion is demonstrated below in connection with FIGS. 7 and 8. In FIG. 7, a point M is depicted. Point M is a point in the plane defined by pivot axes A and B, and it is the point that together with point F defines a line perpendicular to the plane. It is the objective of the proof below to show that point M is stationary. Since point A is stationary, this is proved by showing that the distance from A to M is constant. If this distance is constant, then the line FM is always the same, and so F moves in straight line.

It was noted that it is necessary in order for the straight-line motion to occur that the distance between the principal and auxiliary pivot axes A and B must be equal to the distance between the auxiliary pivot axis B and the point C at which the auxiliary connecting links are connected. This arrangement results in the relationship illustrated in FIG. 8, where the measure (2L) of angle KBC is twice that (L) of angle BAC. Since AB equals BC, triangle ABC is an isosceles triangle, so the measure of angle BCA must also be L. Thus, the measure of ABC is 15 equal to 180° − 2L and the measure of angle KBC is 2L.

With this relationship in mind, inspection of FIGS. 7 and 8 reveals the following identities:

$$AC = AH - CH \qquad (1)$$

$$AF = AP + PF \qquad (2)$$

$$AK = AB + BC\cos 2L$$

Or since
$$AB = BC$$

$$= 2AB\cos^2 L \qquad (3)$$

Now, $$\cos L = AK/AC$$

$$= AM/AF$$

Or, $$\cos^2 L = (AK/AC)(AM/AF)$$

Solving for AM, the length to be proved constant, yields
$$AM = (AC)(AF)(\cos^2 L)/AK \qquad (4)$$

Substitution of (1), (2), and (3) into (4) yields
$$AM = (AH - CH)(AP + PF)/2AB \qquad (5)$$

Since we specified that CD/AD=GF/AG, it will be appreciated that DC is parallel to NF and CE is parallel to FG. Accordingly, $$AP/AH = PF/CH \qquad (6)$$

Solving (6) for AP and substituting the result into (5) yields $$AM = [(AH)^2 - (CH)^2](PF)/[(2)(AB)(CH)]. \qquad (7)$$

Since ADH and CDH are right triangles, application of the Pythagorean theorem yields $$(AH)^2 - (CH)^2 = [(AD)^2 - (DH)^2] - [(CD)^2 - (DH)^2]$$

Or, $$(AH)^2 - (CH)^2 = (AD)^2 - (CD)^2 \qquad (8)$$

Substitution of (6) and (8) into (7) results in the following expression for AM:

$$AM = [(AD)^2 - (CD)^2](AG)/[(2)(AB)(AD)].$$

It is apparent that this expression is a constant, so it has been demonstrated that each ski moves in a straight line during that portion of the cycle in which the auxiliary pivot axis is constrained to remain stationary at a distance from the principal pivot axis that is equal to the distance on the auxiliary pivot link between the auxiliary pivot axis and the point at which the auxiliary pivot link is connected to the auxiliary connecting links.

Figure 9:
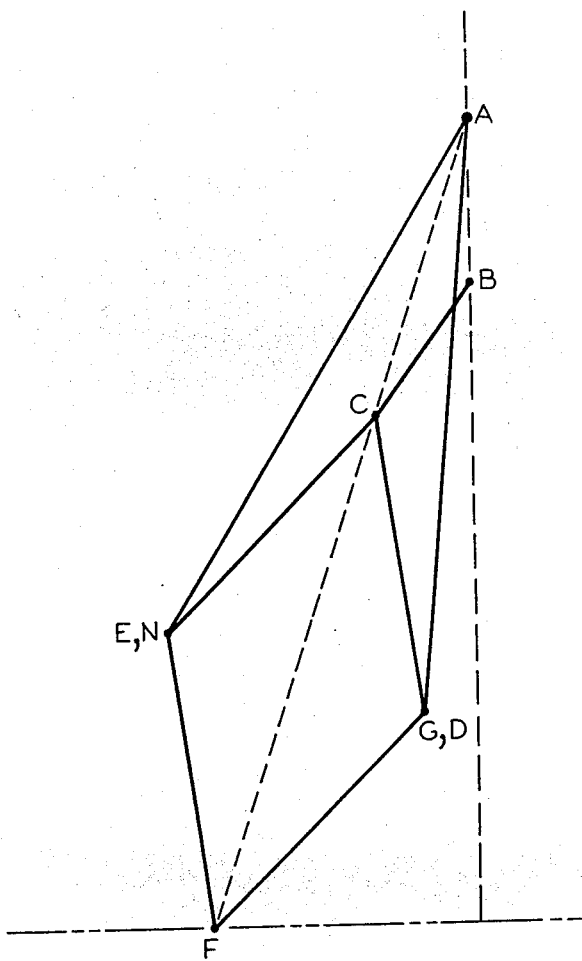
FIG. 9 is a further diagram illustrating an alternate linkage mechanism therefor.

FIG. 9 is a diagram that illustrates a linkage mechanism commonly referred to as Peaucellier's mechanism. By comparing the lettered points in FIG. 9 to the correspondingly lettered points in FIG. 7, one can appreciate that Peaucellier's mechanism is a special case of the mechanism illustrated in FIG. 7. In the Peaucellier mechanism, all of the relationships required above are observed, and, in addition, the points at which the auxiliary connecting links are connected to the principal pivot links are the same as the points at which the principal connecting links are connected to the principal pivot links.

Since Peaucellier's mechanism meets the criteria for straight-line motion, it can be used to carry out the teachings of the present invention in constructing a walking device. However, it is believed that the arrangement of FIG. 3 is much to be preferred because the auxiliary connecting links can be positioned above the floor of the propulsion-system housing, thus eliminating the possibility that damage can result from rocks, for instance, being wedged between the auxiliary connecting links and the main connecting links. It will be appreciated that it is desirable to locate the main pivot point at the floor of the propulsion-system housing, and the arrangement of FIG. 7, in which the principal and auxiliary connecting links are connected to the principal pivot link at opposite sides of the principal pivot axis, thus lends itself particularly well to this application, since driving of the linkage mechanism from within the housing is facilitated. Nonetheless, the linkage mechanism of FIG. 9 could be employed if appropriate safeguards against binding of the various linkages are provided.

Figure 10:
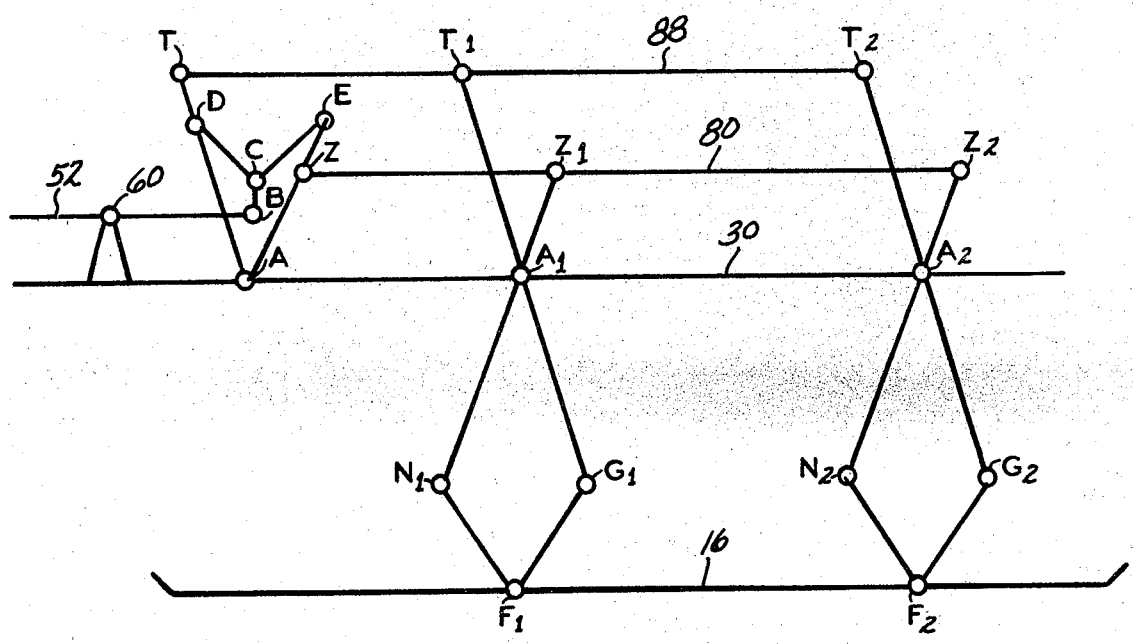
FIGS. 10 and 11 are diagrammatic representations of further embodiments of the invention.

FIG. 10 illustrates an alternate embodiment of the linkage mechanism of FIG. 4. The embodiment of FIG. 10 is shown schematically, and for purposes of explanation, corresponding linkage points in FIG. 10 relative to FIGS. 7–9 are identified with similar letters.

In the linkage mechanism of FIG. 10, the first pivot link assembly is displaced to the right (as shown) with respect to FIG. 4. Alternatively, the first and second principal pivot links may be considered to be longitudinally displaced and actuated by links 80 and 88 in the same manner as slave pivot links 90 and 98. In effect, the lower portion of the linkage assembly 20 in FIG. 3 is longitudinally displaced to provide the first and second slave assemblies. As shown in FIG. 10, the slave pivot axes $A_1$ and $A_2$ of the slave assemblies lie in the horizontal plane of the principal pivot axes A. Parallel motion transmitting links 80 and 88 connect the principal pivot linkage assemblies to maintain the respective principal pivot links and slave pivot links in relative parallelism.

In this embodiment and in the embodiment of FIG. 4, the portions of the principal links 104 (DA) and 106 (EA) above principal pivot 72; auxiliary links 84 (DC) and 86 (EC); auxiliary pivot link 78 (BC); may be considered a control mechanism linkage. For continuity of explanation, the pivot points shown in FIG. 10 will be given the same reference letters as used in FIG. 7 with arabic numerals annexed thereto to denote different locations with respect to support 30. The connections to links 80 is at points T, $T_1$, and $T_2$. The various links will be referenced by the pivot points between which they extend.

Principal control links DA and EA are pivoted to support 30 at A, and to auxiliary connecting links DC and EC at D and E respectively; auxiliary pivot link CB is pivoted to the common ends of DC and EC at C and to support lever 52 at B.

Link 88 is connected to link AD at T, and link 80 is connected to link EA at Z.

Pivot links $Z_1N_1$ and $D_1G_1$ are pivoted to support 30 at $A_1$ and to connecting links $N_1F_1$ and $G_1F_1$ at N1 and G1 respectively. Pivot links $Z_2N_2$ and $D_2G_2$ are pivoted to support 30 at $A_2$ and to connecting links $N_2F_2$ and $G_2F_2$ at $N_2$ and $G_2$, respectively. Connecting links $N_1F_1$ and $G_1F_1$ are pivotally connected to ski 16 at F1. Connecting links $N_2F_2$ and $G_2F_2$ are pivotally connected to ski 16 at $F_2$.

It will be seen that the operation of the apparatus as shown in FIG. 10 will be essentially the same as previously described, differing only in that the principal pivot links 104 and 106 (FIG. 4) are connected to links 80 and 88 instead of being continuations of control links DA and EA (FIG. 10).

The length relationships between the links of the first slave assembly and the principal linkage assembly are as previously identified for linkage assembly 20:

$$A_1G_1 + AD = A_1N_1 + AE$$

$$BC = AB$$

$$F_1G_1 = F_1N_1$$

$$CD/AD = F_1G_1/A_1G_1$$

With the principal pivot axis A and the auxiliary pivot axis B in a fixed position, as previously described, and pivot axes $A_1$ and $A_2$ in the horizontal plane of axis A, straight-line motion is obtained. Straight-line motion is also obtained by the second slave assembly since the corresponding links are of the same length, identically connected, and constrained to remain parallel to the first slave assembly by the connecting links as previously explained with respect to FIG. 4.

Figure 11:
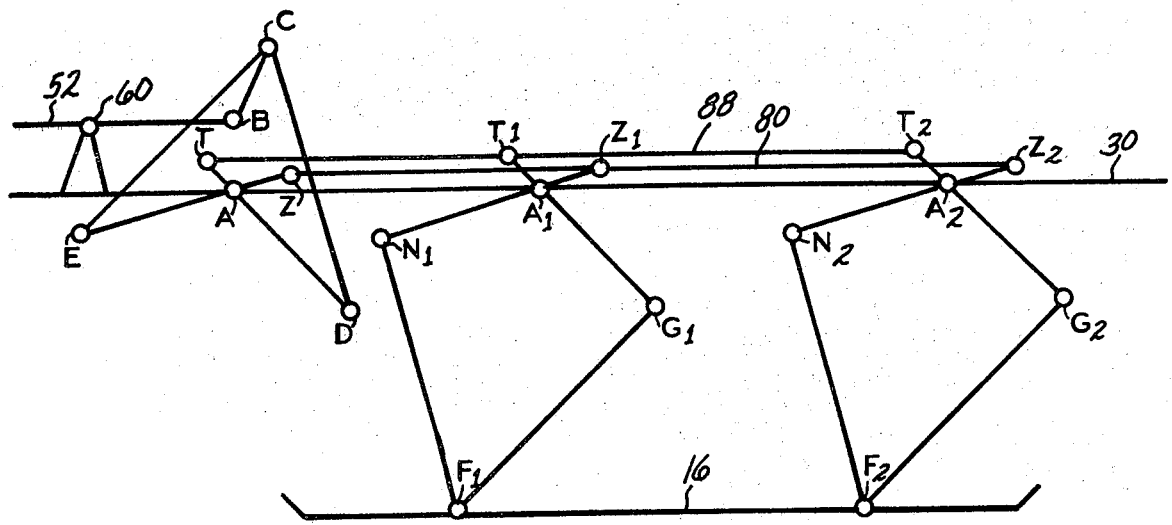

FIG. 11 is similar to FIG. 10, wherein the first and second slave assemblies are similarly connected to the principal linkage assembly. The principal linkage assembly of FIG. 11 is an alternate embodiment wherein the relative position of the links are inverted but the length relationships are maintained and straight-line motion is obtained as previously described.

Having thus described the invention, I claim:

1. In a walking device including a body, at least first and second feet adapted for resting on a support surface, and means for alternately supporting said body on one of said first and second feet while the supporting foot rests on the support surface, means operable to move said body relative to the supporting foot and to move the other foot relative to said body, the walking device being operable for walking motion in which said first foot rests on a support surface and supports said body as said second foot moves forward relative to said body and said body moves forward relative to said first foot and then said second foot rests on the support surface and supports said body as said first foot moves forward relative to said body and said body moves forward relative to said second foot, the improvement wherein:
(a) said body includes a frame member,
(b) first and second principal pivot links pivotally mounted to said frame member about a principal point defining a principal pivot axis, said principal pivot links having ends extending above said principal pivot axis and having lower ends extending below said principal pivot axis,
(c) first and second principal connecting links pivotally connected at first ends thereof to the lower ends of said principal pivot links and pivotally connected at a mounting point defining a common axis on one of said feet,
(d) said first and second principal pivot links and said first and second principal connecting links comprising a principal linkage,
(e) an auxiliary pivot link,
(f) first and second auxiliary connecting links pivotally connected at one end thereof to said first and second principal pivot links above said principal pivot axis and pivotally connected together at their other ends and to one end of said auxiliary pivot link on an auxiliary pivot axis parallel to said principal pivot axis,
(g) said means for alternately supporting comprising a support and lifting means on said frame member pivotally connected to the other end of said auxiliary pivot link,
(h) a drive link pivotally connected at one end thereof to one of said principal pivot links above said frame member, and
(i) said means operable comprising a drive mechanism on said frame member operatively connected to said support and lifting means for raising and lowering said principal pivot links and said foot member through said first and second auxiliary connecting links and said auxiliary pivot link, said drive mechanism being connected to said drive link for horizontally moving said principal linkage and said foot member when said foot member is in a raised position, said drive mechanism being further effective to move said frame member when said foot member is on a supporting surface.

2. The walking device of claim 1 further including means for maintaining said support and lifting means, in a position such that the spacing between said principal and auxiliary pivot axes is substantially equal to the distance on said auxiliary pivot link between said auxiliary pivot axis thereon and said connection to said auxiliary connecting links while said body is supported on said first foot and for spacing said principal and auxiliary pivot axes farther apart when said body rests on said second foot, said first foot thereby being drawn closer to said body while said body rests on a second foot.

3. The walking device of claim 2 wherein said means for maintaining said support and lifting means in a position while said body rests on said first foot includes a passive locking means that is locked to hold said support and lifting means in position while said body rests on said first foot but is unlocked to permit motion of said auxiliary pivot axis away from said principal pivot axis while said body rests on said second foot.

4. The walking device of claim 2 wherein said means for moving said support and lifting means comprises a lever pivotally mounted intermediate its ends to a mounting means on said frame member and pivotally connected at one end thereof to the other end of said auxiliary pivot link, a counterweight on the other end of said lever sized and positioned to aid the movement of said lever away from said principal pivot axis.

5. The walking device of claim 1 further including
a slave linkage pivotally mounted to said frame member and to said foot,
said slave linkage comprising first and second slave pivot links pivotally connected to said frame member about a common slave pivot axis and extending above said frame member,
first and second slave connecting links each pivotally connected at one end thereof to one of said slave pivot links, and connected at the other ends thereof to said foot about a common axis,
said slave linkage being substantially identical to said principal linkage, and
first and second drive links extending between said first principal and slave pivot links and between said second principal and slave pivot links, respectively, to hold said first and second slave pivot links parallel to said first and second principal pivot links, respectively, the foot point at which said slave connecting links are joined thereby moving in a straight line as said foot point at which said principal connecting links are joined moves in a straight line.

6. The walking device of claim 5 wherein:
(a) said frame member includes means defining at least a second principal pivot axis and at least a second auxiliary pivot axis spaced from said second pivot axis;
(b) said second foot includes a mounting portion thereon,
(c) a second principal linkage substantially identical to said principal linkage and connected between said frame member and said second foot, its principal pivot links being pivotably mounted about said second principal pivot axis, and its principal connecting links being pivotably connected to said second foot,
(d) second auxiliary connecting links pivotally connected at first ends thereof to said principal links of said second principal linkage above said principal pivot axis and connected at the other ends thereof to a second auxiliary pivot link, and
(e) the other end of said auxiliary pivot link pivotally connected to a second support and lifting means.

7. The walking device of claim 6 further including a second slave linkage pivotally mounted to said frame member and to said second foot,
said second slave linkage comprising first and second slave pivot links pivotally connected to said frame member about a common slave pivot axis and extending above said frame member,
first and second slave connecting links each pivotally connected at one end thereof the lower ends of said slave pivot links, and connected at the other ends to said foot about a common axis,
said second slave linkage being substantially identical to said second principal linkage, and
first and second drive links extending between said first principal and slave pivot links and between said second principal and slave pivot links, respectively, to hold said first and second slave pivot links parallel to said first and second principal pivot links, respectively, the foot point at which said slave connecting links are joined thereby moving in a straight line as said foot point at which said principal connecting links are joined moves in a straight line.

8. The walking device of claim 1, wherein said body provides a bottom wall and defines a substantially enclosed chamber extending above said bottom wall, said pivotal mounting of said principal pivot links provided on said bottom wall, said auxiliary pivot link and auxiliary connecting links being disposed within said chamber and said first foot being disposed outside said chamber.

9. A linkage assembly for producing straight-line motion relative to a base comprising:
   (a) principal mounting means mounted on a base;
   (b) first and second principal pivot links pivotably mounted intermediate their ends on said principal mounting means for pivoting about a common principal pivot axis extending through principal pivot points on said first and second principal pivot links;
   (c) a support and lifting means;
   (d) an auxiliary pivot link for pivoting about an auxiliary pivot axis extending through a pivot point on said auxiliary pivot link and substantially parallel to said principal pivot axis, said auxiliary pivot link being pivotally connected to said support and lifting means at one point thereof;
   (e) first and second principal connecting links pivotably connected at principal linking points thereon to the lower ends of said first and second principal pivot links, respectively, for pivoting of said first and second principal connecting links relative to said first and second principal pivot links about axes substantially parallel to said principal pivot axis and extending through said principal linking points on said first and second principal connecting links, respectively, each of said principal connecting links being connected at a foot point thereon to the other of said principal connecting links for pivoting of said first and second principal connecting links relative to each other about an axis substantially parallel to said principal pivot axis and extending through said foot points on said first and second principal connecting links;
   (f) first and second auxiliary connecting links pivotably connected at principal linking points thereon to said first and second principal pivot links, respectively, above said base, at positions spaced therealong from said principal linking points on said auxiliary connecting links for pivoting of said first and second auxiliary connecting links relative to said first and second principal pivot links, respectively, about axes substantially parallel to said principal pivot axis and extending through said principal linking points on said first and second auxiliary connecting links, respectively, said first and second auxiliary connecting links being pivotably connected at auxiliary linking points thereon to said auxiliary pivot link for pivoting relative to said auxiliary pivot link about an axis substantially parallel to said auxiliary pivot axis and extending through said auxiliary linking points on said auxiliary connecting links;
   (g) and means for operating said support and lifting means to raise and lower said auxiliary pivot link and to lock said support and lifting means in a position to prevent movement of said auxiliary pivot link;
   (h) the distances from said principal linking point on said first principal connecting link to said principal pivot axis and to said foot point on said principal connecting link being substantially equal to the distances from said principal linking point on said second principal connecting link to said principal pivot axis and to said foot point on said second principal connecting link, respectively, the distances from said principal linking point on said first auxiliary connecting link to said auxiliary linking point thereon and to said principal pivot axis being substantially equal to the distances from said principal linking point on said second auxiliary connecting link to said auxiliary linking point thereon and to said principal pivot axis, respectively, the distances between points on said links substantially bearing the relationship $$W/X = Y/Z,$$

where W is the distance on said first auxiliary connecting link between said principal and auxiliary linking points thereon, X is the distance between said principal pivot axis and said principal linking point on said first auxiliary connecting link, Y is the distance on said first principal connecting link between said foot and principal linking points thereon, and Z is the distance from said principal pivot axis to said principal linking point on said first principal connecting link, whereby motion of said foot point when said principal and auxiliary pivot axis are spaced by a distance equal to the distance between said auxiliary pivot axis and said auxiliary linking points on said auxiliary connecting links is in a substantially straight line substantially perpendicular to the plane defined by said principal and auxiliary pivot axes.

10. The linkage assembly of claim 9, wherein said principal axis is disposed between said principal linking points of said first principal and auxiliary connecting links and between said principal linking points of said second principal and auxiliary connecting links.

11. In a walking device including a body, at least first and second feet adapted for resting on a support surface, and means for alternately supporting said body on one of said first and second feet while the supporting foot rests on the support surface, means operable to move said body relative to the supporting foot and to move the other foot relative to said body, the walking device being operable for walking motion in which said first foot rests on a support surface and supports said body as said second foot moves forward relative to said body and said body moves forward relative to said first foot and then said second foot rests on the support surface and supports said body as said first foot moves forward relative to said body and said body moves forward relative to said second foot, the improvement wherein:
   (a) said body includes a frame having at least a first principal mounting means providing a principal pivot axis;
   (b) first and second control links pivotally mounted to said first principal mounting means about said principal pivot axis, the first of said control links having its other end pivotally connected to an end of a first auxiliary connecting link at a first principal linking point, the second of said control links being connected intermediate the ends thereof to an end of a second auxiliary connecting link at a second principal linking point, said auxiliary connecting links having their other ends pivotally connected together and to an auxiliary pivot link at an auxiliary linking point on an auxiliary pivot axis parallel to said principal pivot axis, said auxiliary pivot link being pivotally connected at the other end thereof to a support and lifting means on said frame about a pivot axis parallel to said principal pivot axis, means for operating said support and lifting means to lock said auxiliary pivot link against movement and to raise and lower said auxiliary pivot link; the distance from said principal linking point on said first auxiliary connecting link to said auxiliary linking point thereon and to said principal linking axis being substantially equal to the distances from said principal linking point on said second auxiliary connecting link to said auxiliary linking point thereon and said principal pivot axis;

(c) said first foot includes a principal mounting portion thereon; and (d) a linkage assembly connected between said frame and said first foot, said linkage assembly including:
  i. First and second principal pivot links mounted at pivot points thereon on a second principal mounting means defining a second principal pivotal axis on said frame longitudinally spaced from said first principal mounting means for pivoting about a common pivot axis;
  ii. first and second principal connecting links pivotably connected at principal linking points thereon to said first and second principal pivot links, respectively, for pivoting of said first and second principal connecting links relative to said first and second principal pivot links about axes substantially parallel to said second principal pivot axis entending through said principal linking points on said first and second principal connecting links, respectively, each of said principal connecting links being pivotally connected at a foot point thereon to said principal mounting portion on said first foot for pivoting of said first and second principal connecting links relative to each other about an axis substantially parallel to said second principal pivot axis and entending through said foot points on said first and second principal connecting links, and the distances from said principal linking point on said first connecting link to said second principal pivot axis and to said foot point on said principal connecting link being substantially equal to the distances from said linking point on said second connecting link to said second principal pivot axis and to said foot point on said second connecting link, respectively.
  iii. and a first force transmitting link connecting an end of one of said principal pivot links extending beyond said second principal axis above said frame to one of said control links, a second force transmitting link connecting said other of said control links to an end of the other of said principal pivot links entending beyond said second principal axis above said frame, said force transmitting links being essentially parallel to each other;

were the distances between points on said links substantially bearing the relationship $W/X = Y/Z,$ where W is the distance on said first auxiliary connecting link between said principal and auxiliary linking points thereon, X is the distance between said second principal pivot axis and said principal linking point on said first auxiliary connecting link, Y is the distance on said first principal connecting link between said foot and principal linking points thereon, and Z is the distance from said second principal pivot axis to said principal linking point on said first principal connecting link, whereby motion of said foot point when said principal and auxiliary pivot axes are spaced by a distance equal to the distance between said auxiliary pivot axis and said auxiliary linking points on said auxiliary connecting links is in a substantially straight line substantially perpendicular to the plane defined by said principal and auxiliary pivot axes, and whereby substantially straight-line motion of said body relative to said first foot while said first foot rests on the support surface and said body is supported on said first foot can be effected by pivoting one of said principal pivot links while said first principal and auxiliary mounting means on said body remains stationary relative to said body to maintain the spacing between said principal and auxiliary pivot axes equal to the distance between said auxiliary pivot axis and said auxiliary linking points on said auxiliary connecting links.

12. The device of claim 11, where said principal pivot axis and said second principal pivot axis coincide and said first and second control links are extensions of said first and second principal pivot links, and further comprising a second linkage assembly connected between said frame and said first foot about another pivot axis parallel to the coinciding principal pivot axis and longitudinally spaced therefrom, the principal links of said second linkage assembly extending above said frame, said force transmitting links connecting said first and second linkage assemblies.

13. The device of claim 11 wherein said support and lifting means includes a lever pivotally mounted intermediate the ends thereof to a mounting means on said frame and is adjustable in position to vary the distance between said principal and auxiliary pivot points and wherein said support and lifting means includes means for maintaining said support and lifting lever in position such that the spacing between said principal and auxiliary pivot axes is substantially equal to the distance on said auxiliary pivot link between said pivot point thereon and said linking point thereon while said body is supported on said first foot and for spacing said principal and auxiliary pivot axes farther apart when said body rests on a second foot, said first foot thereby being drawn closer to said body while said body rests on said second foot.

14. The walking device of claim 11, wherein said support and lifting means includes a passive locking means that is locked to hold said auxiliary pivot axis in position while said body rests on said first foot but is unlocked to permit motion of said auxiliary pivot axis away from said principal pivot axis while said body rests on said second foot.

15. The walking device of claim 13, further including a counterweight on said support and lifting lever sized and positioned to aid the movement of said auxiliary pivot axis away from said principal pivot axis.

16. The device of claim 11, further comprising a second linkage assembly substantially identical to said linkage assembly connected between said body said second foot about a third principal axis parallel to said principal axis and said second axis and longitudinally spaced from said second principal axis, said force transmitting links extending and pivotally connected to the principal links of said second linkage assembly.

17. In a walking device including a body, at least first and second feet adapted for resting on a support surface, and means for alternately supporting said body on one of said first and second feet while the supporting foot rests on the support surface, means operable to move said body relative to the supporting foot and to move the other foot relative to said body, the walking device being operable for walking motion in which said first foot rests on a support surface and supports said body as said second foot moves forward relative to said body and said body moves forward relative to said first foot and then said second foot rests on the support surface and supports said body as said first foot moves forward relative to said body and said body moves forward relative to said second foot, the improvement wherein:

(a) said body includes a frame;
(b) said means for alternately supporting comprises a pair of operating mechanisms for said first and second feet, each mechanism comprising
  (i) first and second control links pivotally mounted at first ends thereof to said frame about a first principal pivot axis;
  (ii) first and second auxiliary connecting links pivotally together at first ends thereof and to one end of an auxiliary pivot link, the other ends of said auxiliary connecting links being pivotally connected to the other ends of said control links, said control links, auxiliary connecting links and auxiliary pivot link defining a control linkage;
  (iii) first and second principal pivot links pivotally connected to said frame about a second principal pivot axis parallel to and longitudinally spaced from said first principal axis and having upper ends extending above said frame and lower ends below said frame;
  (iv) first and second principal connecting links pivotally connected at first ends thereof to said lower ends of said principal connecting links and pivotally connected together together about a foot point on said first foot, said principal links and said principal connecting links defining a principal linkage;
  (v) a support and lifting means pivotally connected at one end thereof to the other end of said auxiliary pivot link about an auxiliary pivot axis;
  (vi) a drive link connected at one end thereof to one of said control links;
  (vii) a first force transmitting link connecting an end of one of said principal pivot links to one of said control links above said frame, a second force transmitting link connecting said other control link to an end of the other of said principal pivot links above said frame, and
(c) said means operable comprising a drive mechanism on said frame operatively connected to each of said support and lifting means to raise said principal linkage and said foot members through said first and second auxiliary connecting links and said auxiliary pivot link, said drive mechanism also being connected to said drive links for horizontally moving said principal linkages when a principal linkage is in a raised position, said drive mechanism being further effective through said drive link to move said frame member relative to a foot member on a supporting surface.

18. The device of claim 17, where said principal pivot axes and said second principal pivot axes of each of said operating mechanisms coincide and said first and second control links of each of said operating mechanisms are extensions of said first and second principal pivot links, each operating mechanism further comprising a slave linkage connected between said frame and each of said feet about another principal axis parallel to the coinciding principal axis and longitudinally spaced therefrom, said slave linkages being substantially identical to said principal linkages, the principal links of said slave linkages extending above said frame, said force transmitting links connecting a principal linkage and a slave linkage.

19. The device of claim 17 wherein each of said support and lifting means includes a lever pivotally mounted intermediate the ends thereof to a mounting means on said frame and is adjustable in position to vary the distance between said principal and auxiliary pivot axes of each operating mechanism, and wherein said support and lifting means includes means for maintaining said lever in position such that the auxiliary pivot axis is fixed relative to said principal pivot axis of said operating mechanism connected to said first foot while said body is supported on said first foot and for spacing said principal and auxiliary pivot axes of said first operating mechanism farther apart when said body rests on said second foot, said first foot thereby being drawn closer to said body while said body rests on said second foot.

20. The walking device of claim 17, wherein each of said support and lifting means includes a passive locking means that is locked to hold said auxiliary pivot axis in position while said body rests on said first foot but is unlocked to permit motion of said auxiliary pivot axis away from said principal pivot axis while said body rests on said second foot.

21. The walking device of claim 19, further including a counterweight on each of said levers sized and positioned to aid the movement of said auxiliary pivot axis away from said principal pivot axis.

* * * * *

UNITED STATES PATENT AND TRADEMARK OFFICE
CERTIFICATE OF CORRECTION

PATENT NO. : 4,462,476
DATED : July 31, 1984
INVENTOR(S) : NIKOLAY SHKOLNIK

It is certified that error appears in the above-identified patent and that said Letters Patent are hereby corrected as shown below:

IN THE CLAIMS

Column 17, Claim 11(d), at (ii), Line 44, last word of line: change "entending" to -- extending --.

Column 17, Claim 11(d), at (iii), Line 65,: change "were" to -- where --.

Column 19, Claim 17(b) at (iv), Line 47: correct line to read -- pivotally connected together about a -- from "pivotally connected together together about a".

Signed and Sealed this

Fifteenth Day of January 1985

[SEAL]

Attest:

Attesting Officer

GERALD J. MOSSINGHOFF
Commissioner of Patents and Trademarks